(12) United States Patent
Dasgupta

(10) Patent No.: US 11,815,379 B2
(45) Date of Patent: Nov. 14, 2023

(54) ELECTROMAGNETIC FLOWMETER ASSEMBLY WITH A ROTATABLE MAGNETIC RING ON A SURFACE OF THE CONDUIT FOR ADJUSTING VARYING MAGNETIC FIELD

(71) Applicant: ABB Schweiz AG, Baden (CH)

(72) Inventor: Subhashish Dasgupta, Bangalore (IN)

(73) Assignee: ABB Schweiz AG

( * ) Notice: Subject to any disclaimer, the term of this patent is extended or adjusted under 35 U.S.C. 154(b) by 266 days.

(21) Appl. No.: 17/289,628

(22) PCT Filed: Oct. 25, 2019

(86) PCT No.: PCT/IB2019/059170
§ 371 (c)(1),
(2) Date: Apr. 28, 2021

(87) PCT Pub. No.: WO2020/089755
PCT Pub. Date: May 7, 2020

(65) Prior Publication Data
US 2021/0396558 A1 Dec. 23, 2021

(30) Foreign Application Priority Data
Oct. 29, 2018 (IN) .............................. 201841040770

(51) Int. Cl.
*G01F 1/58* (2006.01)
*G01F 25/10* (2022.01)
*G01F 1/60* (2006.01)

(52) U.S. Cl.
CPC ................ *G01F 1/588* (2013.01); *G01F 1/60* (2013.01); *G01F 25/10* (2022.01)

(58) Field of Classification Search
None
See application file for complete search history.

(56) References Cited

U.S. PATENT DOCUMENTS

| 4,059,014 A | 11/1977 | Torimaru |
| 4,137,765 A | 2/1979 | Matsushita |

(Continued)

FOREIGN PATENT DOCUMENTS

| CN | 102853869 A | 2/2013 |
| GB | 834011 A | 5/1960 |

(Continued)

OTHER PUBLICATIONS

European Patent Office, International Search Report for PCT/IB2019/059170, dated Jan. 27, 2020, 4 pages.

(Continued)

*Primary Examiner* — Harshad R Patel
(74) *Attorney, Agent, or Firm* — Leydig, Voit & Mayer, Ltd.

(57) ABSTRACT

An electromagnetic flowmeter for measuring flow of fluid flowing in a conduit of the electromagnetic flowmeter, wherein the electromagnetic flowmeter includes: a coil attached to an inner surface of the conduit; a movable magnetic ring having segments of magnetic materials that is magnetically coupled with the coil to generate an electromagnetic field to interact with the fluid flowing through the conduit wherein the conduit is provided with an insulating liner. A pair of electrodes mounted on the conduit for measuring potential difference generated by the interaction of the electromagnetic field in the fluid. Wherein the segments of magnetic materials are having varying magnetic properties arranged to have an orderly varying electromagnetic field in the conduit adjustable by rotating the movable magnetic ring. The movable magnetic ring is positioned between the at least one coil and the insulating liner.

6 Claims, 5 Drawing Sheets

(56) References Cited

U.S. PATENT DOCUMENTS

| | | | |
|---|---|---|---|
| 6,085,599 A | 7/2000 | Feller | |
| 2005/0162154 A1* | 7/2005 | Mol | G01P 3/487 |
| | | | 324/179 |
| 2010/0107776 A1 | 5/2010 | Shanahan | |
| 2013/0006544 A1 | 1/2013 | Rovner | |

FOREIGN PATENT DOCUMENTS

| | | |
|---|---|---|
| JP | S5789927 U | 6/1982 |
| WO | 2017108276 A1 | 6/2017 |

OTHER PUBLICATIONS

European Patent Office, Written Opinion for PCT/IB2019/059170, dated Jan. 27, 2020, 7 pages.
Indian Patent Office, First Examination Report for related IN 201841040770, dated Sep. 1, 2020, 5 pages.

* cited by examiner

ELECTROMAGNETIC FLOWMETER ASSEMBLY WITH A ROTATABLE MAGNETIC RING ON A SURFACE OF THE CONDUIT FOR ADJUSTING VARYING MAGNETIC FIELD

CROSS-REFERENCE TO RELATED APPLICATIONS

This application is a U.S. national stage of International Application Serial No. PCT/IB2019/059170, filed Oct. 25, 2019, which claims priority to Indian Patent Application No. 201841040770, filed Oct. 29, 2018. The entire disclosures of both of the foregoing applications are incorporated herein by reference.

FIELD OF THE INVENTION

The present invention relates generally to an electromagnetic flowmeter and more particularly to an electromagnetic flowmeter assembly with a movable ring.

BACKGROUND OF THE INVENTION

Measurement of flow of fluids through a conduit or pipe can be done by numerous ways like using electromagnetic flowmeters.

A typical electromagnetic flowmeter works on Faraday's law of electromagnetic induction. An electromagnetic field is imposed within a flow pipe having a flow of fluid with a certain level of conductivity. Electromotive force (EMF) induced as a result of the interaction of the electromagnetic field with fluid molecules (ions in the fluid), is measured using electrodes provided at the pipe side walls. The measured EMF is proportional to the flowrate and thus used to measure flowrate. While electromagnetic flowmeters are attractive given that they are accurate and simplistic in construction, conditions of the site where the electromagnetic flowmeter is installed is also important in ensuring correct measurement of the flow rate of fluid flowing in the electromagnetic flowmeter.

An electromagnetic flowmeter may be installed at a site with different conditions of installation specific to the site. A condition like a bend, valve, reducer etc. in the pipe upstream of the flowmeter can cause a disturbance in the fluid flowing to the electromagnetic flowmeter. In other words upstream disturbances alter the calibration factor of the electromagnetic flowmeter, from the value obtained under standard lab conditions (during the calibration procedure). Downstream disturbances have little effect on the measurement values of the electromagnetic flowmeter, which however cannot be neglected.

The effect of upstream flow profile disturbances, on measurement accuracy have been encountered in electromagnetic flowmeters. A current practice to overcome this is to use a fluid flow straightener or an obstacle designed to modify flow and hence to induce flow profile uniformity. However, such features can cause pressure drop, have manufacturability issues and could suffer corrosion/erosion depending on fluid temperature and/or composition. Also, flow profile disturbances could be of several types due to several types of upstream disturbances (e.g. Disturbance due to a bend, disturbance due to a valve etc.). It is a challenge to design a universal flow conditioner for all such disturbances.

Currently, in order to mitigate adverse effect of bends and other upstream features on measurement accuracy several techniques are implemented. For example by using large electrodes to average out the effect of flow profile distortion. However, this calls for additional electrodes and other design complexities. Flowmeter pipes with non-circular cross section, have been known to perform better than circular cross section flowmeters. Reducing the cross-sectional area of flowmeters (also called reduced bore flowmeter) a currently existing design, is effective in lessening the effect of flow distortion. However, modification to pipe cross-sectional size and shape poses manufacturing and installation challenges and also cause pressure drop along the flow line.

Hence there is a need for an electromagnetic flowmeter assembly that provides measurement with a minimized effect of flow distortion due to upstream features.

SUMMARY

The above-mentioned shortcomings, disadvantages and problems are addressed herein which will be understood by reading and understanding the following specification.

In one aspect, the present invention provides an electromagnetic flowmeter for measuring flow of fluid flowing in a conduit of the electromagnetic flowmeter. The electromagnetic flowmeter comprises: firstly at least one coil attached to an inner surface of the conduit and excited by an excitation unit. Secondly, a movable magnetic ring having a plurality of segments of magnetic materials that is magnetically coupled with the at least one coil to generate an electromagnetic field to interact with the fluid flowing through the conduit wherein the conduit is provided with an insulating liner. Thirdly, a pair of electrodes mounted on the conduit for measuring potential difference generated by the interaction of the electromagnetic field in the fluid. And finally, the plurality of segments of magnetic materials are having varying magnetic properties and are arranged to have an orderly varying electromagnetic field in the conduit adjustable by rotating the movable magnetic ring and wherein the movable magnetic ring is positioned between the at least one coil and the insulating liner.

In an embodiment of the electromagnetic flowmeter the orderly varying electromagnetic field in the conduit is adjusted by rotating the movable magnetic ring with a knob.

In an embodiment of the electromagnetic flowmeter the movable magnetic ring is rotated to adjust the varying electromagnetic field in the conduit based on distortion of flow of the fluid in the conduit due to a bend upstream to the flow of the fluid.

In an embodiment of the electromagnetic flowmeter the movable magnetic ring is provided with graduation mark denoting angles for rotation.

In an embodiment of the electromagnetic flowmeter the movable magnetic ring is rotated along the graduation mark denoting angles corresponding to an angle of bend upstream to the flow of the fluid to have an orderly varying electromagnetic field in the conduit.

In an embodiment of the electromagnetic flowmeter the movable magnetic ring is rotated along the graduation mark based on a relationship between the graduation mark and distortion in the velocity profile of the fluid.

BRIEF DESCRIPTION OF DRAWINGS

The appended drawings illustrate exemplary embodiments as disclosed herein, and are not to be considered limiting in scope. In the drawings.

DETAILED DESCRIPTION

The present invention is related to measurement of flow rate of a fluid flowing in a pipe by an electromagnetic flowmeter that is installed at a downstream position to a bend of the pipe. Usually, an electromagnetic flowmeter comprises a conduit layered with an inner lining/liner or an insulating pipe that carries the fluid, two electromagnetic coils one each, at the top and bottom of the insulating pipe or liner, a pair of electrodes inserted at the sides of the liner for measurement and a magnetic cover encloses all the elements which contains the generated magnetic field and ensures stronger fields for interaction with the fluid. When the coils are powered, an electromotive force (EMF) is induced within the fluid. By measuring this EMF using electrodes the flowrate is estimated. The EMF divided by velocity is the calibration factor of the given flowmeter. The calibration factor is obtained under ideal laboratory conditions with a straight length of pipe upstream of the flowmeter. However, distortion to flow profiles imposed by bends and other such upstream features in the field, can alter the calibration factor, affecting measurement accuracy. This distortion results in measurement inaccuracy, revealed by tests and modeling.

The present invention provides for minimizing the effect of flow distortion due to upstream features by modifying the magnetic field or flux distribution within the flowmeter. Currently flow modifying structures are implemented in electromagnetic flowmeters to minimize effect of flow distortion, such structures cause pressure drop. The varying angles and positions of installation of the electromagnetic flowmeter has an impact on the flow profile and a deviation from standard conditions can be expected resulting in erroneous measurements. The current invention caters to such dynamic conditions of installation and provides a correct measurement of the flow rate of the fluid under such conditions.

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be adapted. The following detailed description is, therefore, not to be taken in a limiting sense.

Figure 1:
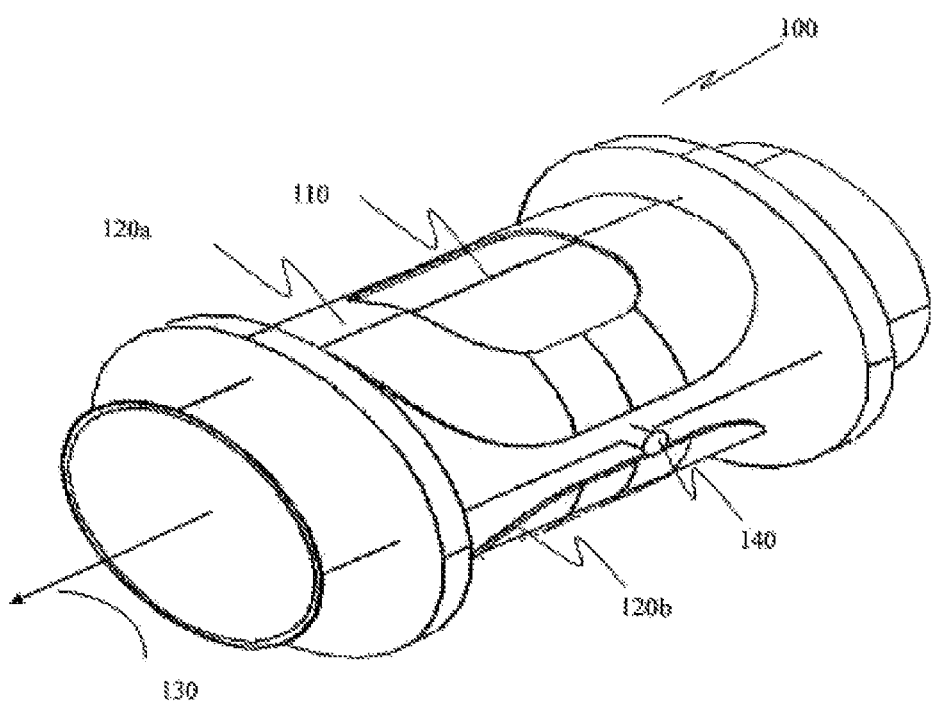
FIG. 1 shows a conduit of an electromagnetic flowmeter for measuring a flow of fluid in a flow pipe.

FIG. 1 shows a conduit for an electromagnetic flowmeter 100, which comprises a conduit/flow pipe 110 through which fluid flows, one or more coils 120a, 120b excited electrically by an excitation unit (not shown) for generating electromagnetic fields that interact with the fluid passing through the conduit/flow pipe, a pair of electrodes (140- referencing an electrode shown in the figure, there is an electrode not visible in the figure but present at the opposite side of the conduit/flow pipe facing the electrode 140). The flowing fluid passes through the conduit 110 in the electromagnetic flowmeter. The one or more coils provided above the conduit 110, as shown in FIG. 1, are electrically excited, they generate an electromagnetic field that traverses the conduit 110 volume. As will be known to the persons skilled in the art, the coil can be of different shapes and number (in FIG. 1, two coils are shown) depending on the need for magnetic field intensity. Interaction of the magnetic flux and the moving fluid, causes a potential difference (Faraday's law of electromagnetic induction) to be measured by the electrodes 140, 150 provided at the walls encompassing the cavity.

Figure 2:
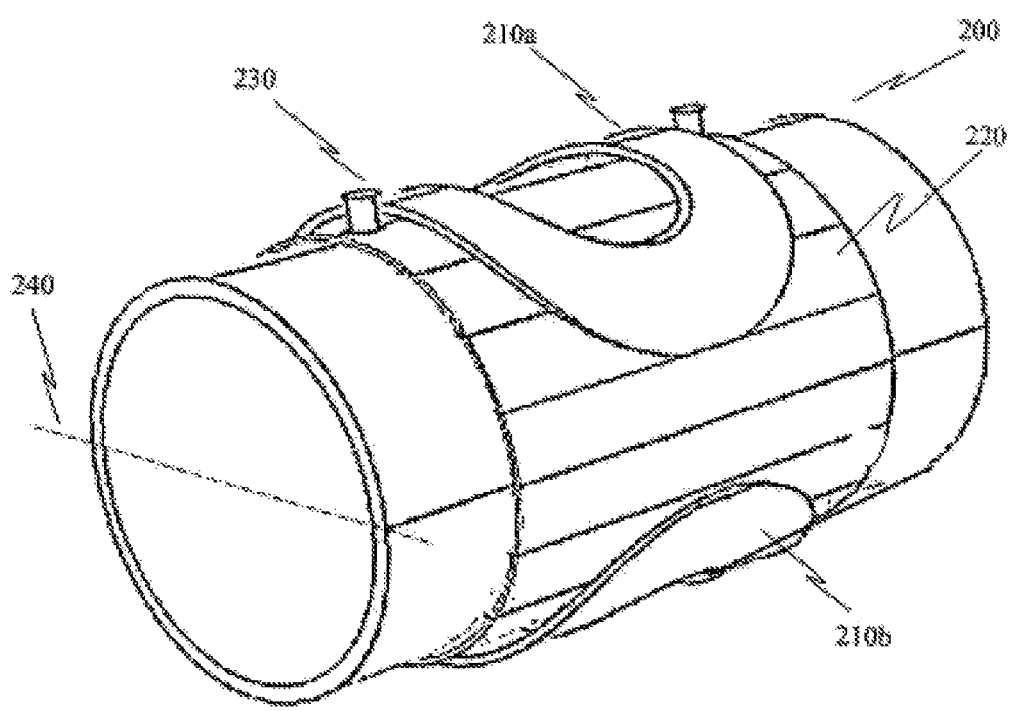
FIG. 2 shows a conduit of an electromagnetic flowmeter with a movable magnetic ring for measuring a flow of fluid in a flow pipe.

FIG. 2 shows the conduit 200 of the electromagnetic flowmeter along with the coils for generating the electromotive force. The coils 210a, 210b are attached to the conduit and excited by an excitation unit (not shown) symmetrically across the line of symmetry 240. FIG. 2 shows a movable magnetic ring 220 positioned between the coil and an insulating liner (not shown) provided in the conduit. The movable magnetic ring is having a plurality of segments of magnetic materials that is magnetically coupled with the coil 210 to generate an electromagnetic field to interact with the fluid flowing through the conduit. The plurality of segments of magnetic materials are having varying magnetic properties. The segments of magnetic materials are arranged to have an orderly varying electromagnetic field in the conduit depending on the area of the segment that is in vicinity of the coils. Thus, electromagnetic field of adjustable strength in the conduit gets generated to interact with the fluid by rotating the movable magnetic ring to have varying one or more segments that gets magnetically coupled with the coil. By rotating the magnetic ring 220 a desired electromagnetic filed can be generated and inaccuracy in the measurement of fluid flow rate due to distortion of flow in the fluid can be compensated to obtain an accurate measurement of fluid flow rate by such adjustment in field strength in the conduit.

The adjustment for varying electromagnetic field in the conduit can be made by rotating the movable magnetic ring by a knob 230 as shown in FIG. 2. The movable magnetic ring is rotated to adjust the varying electromagnetic field in the conduit using the knob 230 based on distortion of flow of the fluid in the conduit due to a bend upstream to the flow of the fluid. In an embodiment, the movable magnetic ring is provided with graduation marks denoting angles for rotation. And the movable magnetic ring is rotated along the graduation mark denoting angles corresponding to an angle of bend upstream to the flow of the fluid to have an orderly varying electromagnetic field in the conduit. In this design, the coils are not fixed to the liner like in the current flowmeters. FIG. 2 shows the movable magnetic ring 220 with segments of magnetic material provided below the coils and loosely connected on the liner surface to support rotation. The magnetic ring 220 is provided with knobs to enable rotation of the movable magnetic ring to a particular degree to manipulate (adjust) magnetic field distribution, in order to counter distortion effect of a given upstream bend. This way magnetic field is modified in order to overcome error induced by an upstream bend of a given angle. In an embodiment a curve is provided relating the angle of rotation with the angle of the bend to enable rotation of the magnetic ring based on the angle of upstream bend. This curve can be obtained from a validated scientific model of the flowmeter.

Figure 3:
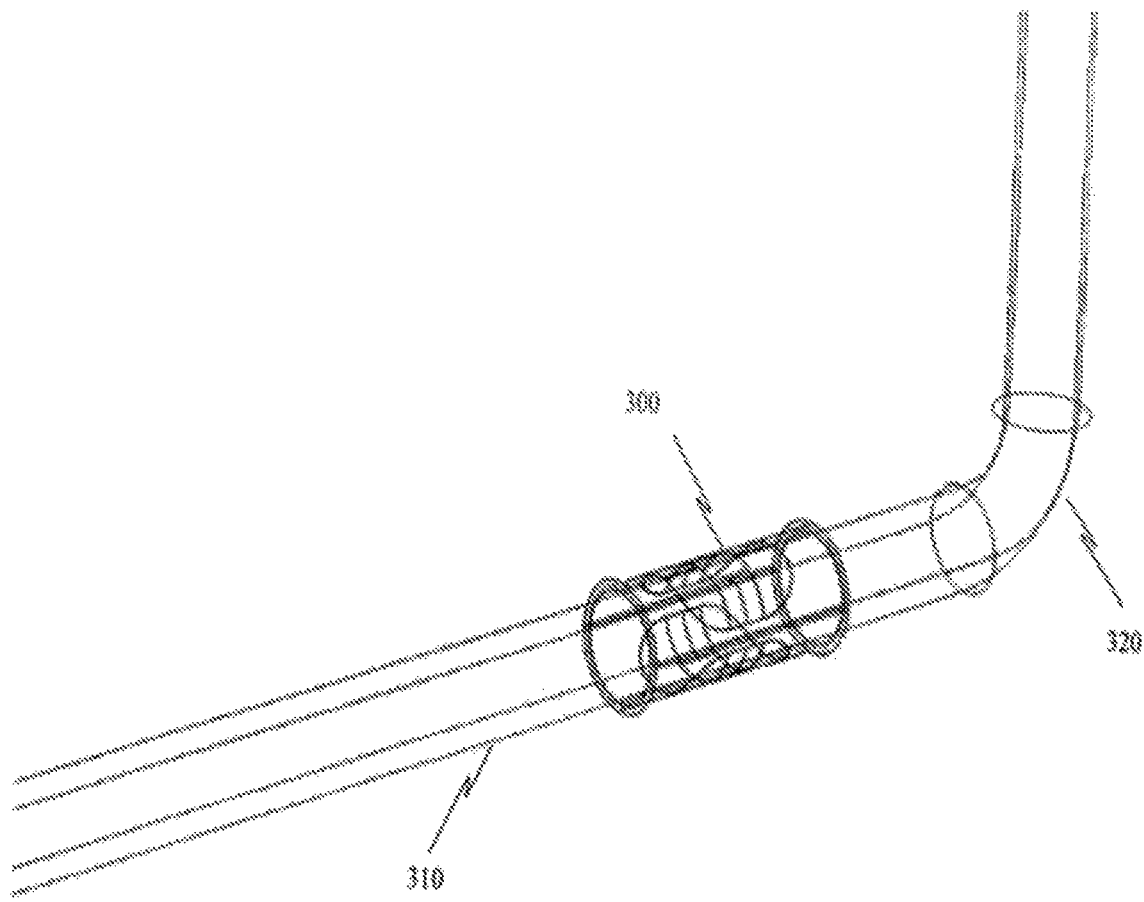
FIG. 3 shows an electromagnetic flowmeter installed downstream to a bend pipe.

FIG. 3 shows an electromagnetic flowmeter (300) that is installed in a pipe (310) with an upstream bend of 90 degrees 320). In an exemplary embodiment where the magnetic ring 220 is provided with graduations, if there is an upstream bend angle of 90 degrees as shown in FIG. 3, the magnetic ring is rotated to the 90 degree graduation mark provided alongside the ring, in order to reduce the error. However, depending on the design of the flowmeter, the relationship between the required angle of rotation of the ring and the angle of the bend may not be linear. This way for any bend angle the magnetic field can be manipulated/adjusted to reduce error.

Figure 4:
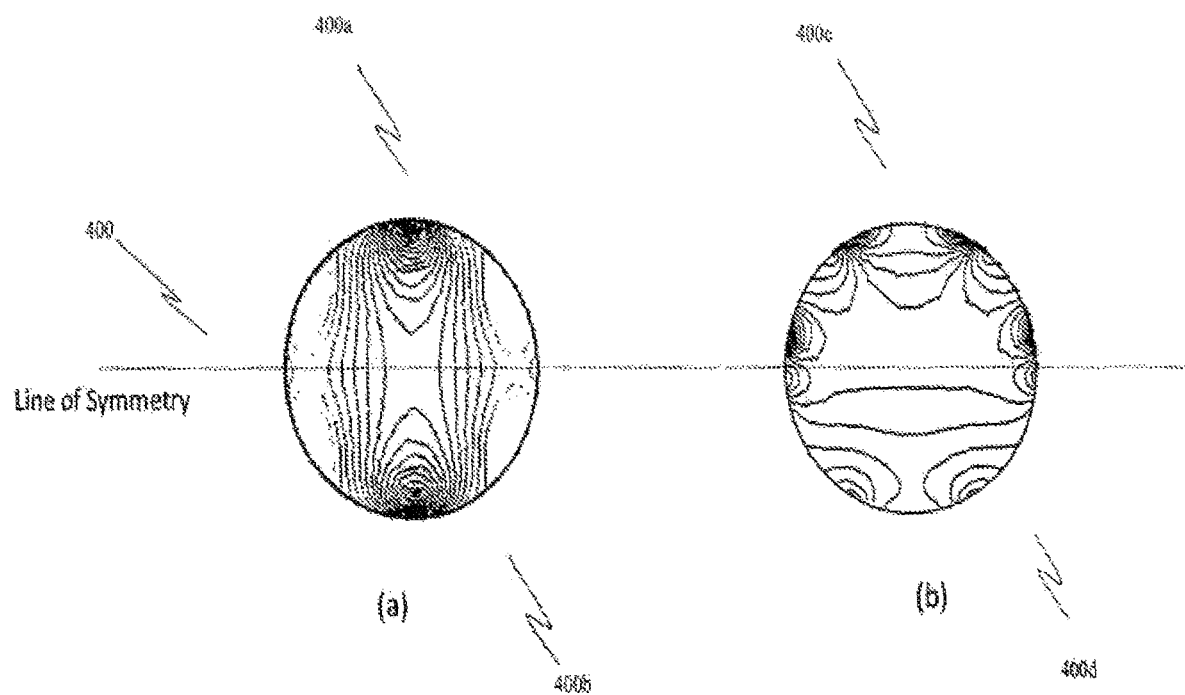
FIG. 4a shows a view of the bore of the electromagnetic flowmeter with uniform magnetic field.
FIG. 4b shows a view of the bore of the electromagnetic flowmeter with modified magnetic field.

FIG. 4a shows cross sectional view of the bore of the electromagnetic flowmeter indicating the magnetic field or flux distribution. The field distributions (400a, 400b) are symmetric about the line of symmetry 400 in FIG. 4a. FIG. 4b shows the cross sectional view of the bore of the electromagnetic flowmeter indicating the magnetic field or flux distribution that is modified or asymmetric about the line of symmetry (400c, 400d) due to the effect of varying electromagnetic field by rotating the movable ring and bringing a different segment of the ring to magnetically couple with the coil compared with that of the electromagnetic flowmeter depicted in FIG. 4a. The asymmetry is induced in order to overcome the effects of measurement inaccuracy resulting from distortion in flow of the fluid. This modification results in improved accuracy or significant reduction in error.

Figure 5:
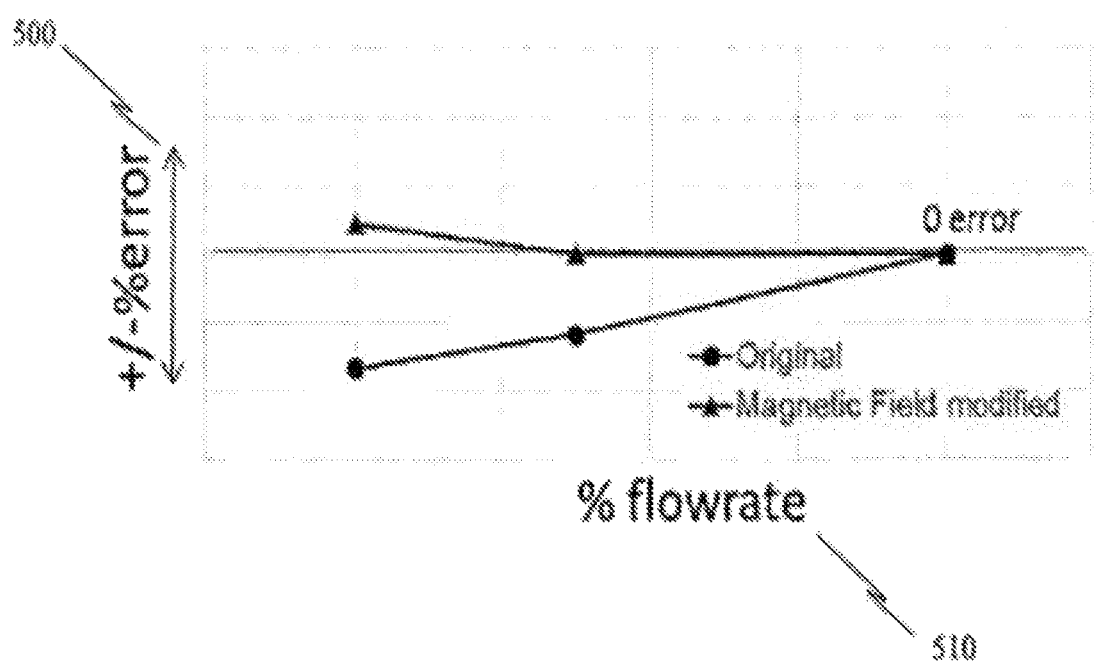
FIG. 5 shows a graphical representation of the reduction in error of the measured flow rate due to a modified magnetic field.

FIG. 5 shows an exemplary result depicting reduction in error due to modified magnetic field in comparison to original magnetic field. As shown in FIG. 5, the plot of percentage error 500 versus the percentage flowrate 510 shows a significant reduction in error in comparison between an original magnetic field and a modified magnetic field. Thus for a scenario where the electromagnetic flowmeter are installed downstream to a bend in a pipe or any other location in the pipe where a possibility of flow distortion arises, the magnetic field can be modified by rotating the magnetic ring to generate requisite magnetic field for a correct measurement of flowrate. The level of rotation of the magnetic ring can be based on the angle of the bend in the pipe or any other relationship signifying the distortion in the velocity profile of the fluid.

The flowmeter for exciting the coils for producing electromagnetic fields have a suitable power source and electronics circuitries for making potential difference measurements and display/transmitting the measured values. In an embodiment, the electromagnetic flowmeter can comprise a display for indicating the determined flow of fluid in the flow pipe.

In an embodiment, the electromagnetic flowmeter is Internet of Things (IOT) enabled for providing remote controlling, better visibility of the working of the electromagnetic flowmeter, providing real time information to software systems and other surrounding IOT enabled systems including remote storing and remote analysis of electromagnetic flowmeter. Thereby having the above mentioned configurations for the electromagnetic flowmeter also enabled through remote support.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. An electromagnetic flowmeter for measuring flow of fluid flowing in a conduit of the electromagnetic flowmeter, wherein the electromagnetic flowmeter comprises:
   at least one coil attached to a surface of the conduit and excited by an excitation unit;
   a movable magnetic ring having a plurality of segments of magnetic materials that is magnetically coupled with the at least one coil to generate an electromagnetic field to interact with the fluid flowing through the conduit;
   a pair of electrodes mounted on the conduit for measuring potential difference generated by the interaction of the electromagnetic field in the fluid; and
   wherein the plurality of segments of magnetic materials are having varying magnetic properties and are arranged to have an orderly varying electromagnetic field in the conduit adjustable by rotating the movable magnetic ring and wherein the movable magnetic ring is positioned between the at least one coil and the surface of the conduit.

2. The electromagnetic flowmeter as claimed in claim 1, wherein the orderly varying electromagnetic field in the conduit is adjusted by rotating the movable magnetic ring with a knob.

3. The electromagnetic flowmeter as claimed in claim 1, wherein the movable magnetic ring is rotated to adjust the varying electromagnetic field in the conduit based on distortion of flow of the fluid in the conduit due to a bend upstream to the flow of the fluid.

4. The electromagnetic flowmeter as claimed in claim 1, wherein the movable magnetic ring is provided with a graduation mark denoting angles for rotation.

5. The electromagnetic flowmeter as claimed in claim 4, wherein the movable magnetic ring is rotated along the graduation mark denoting angles corresponding to an angle of bend upstream to the flow of the fluid.

6. The electromagnetic flowmeter as claimed in claim 4, wherein the movable magnetic ring is rotated along the graduation mark based on a relationship between the graduation mark and distortion in the velocity profile of the fluid.

* * * * *